United States Patent
Aboelnaga et al.

(10) Patent No.: US 11,114,854 B1
(45) Date of Patent: Sep. 7, 2021

(54) DUAL CURRENT CONTROLLER OF INVERTER INTERFACED RENEWABLE ENERGY SOURCES FOR ACCURATE PHASE SELECTION METHOD AND GRID CODES COMPLIANCE

(71) Applicant: KING ABDULAZIZ UNIVERSITY, Jeddah (SA)

(72) Inventors: Abdallah Aboelnaga, Jeddah (SA); Hatem Sindi, Jeddah (SA); Maher Azzouz, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/173,804

(22) Filed: Feb. 11, 2021

(51) Int. Cl.
*H02J 3/00* (2006.01)
*H02J 3/38* (2006.01)
*H02J 13/00* (2006.01)
*G05B 19/042* (2006.01)

(52) U.S. Cl.
CPC .......... *H02J 3/0012* (2020.01); *G05B 19/042* (2013.01); *H02J 3/381* (2013.01); *H02J 13/00002* (2020.01); *G05B 2219/2639* (2013.01); *H02J 2300/20* (2020.01)

(58) Field of Classification Search
CPC .... H02J 3/0012; H02J 3/381; H02J 13/00002; H02J 2300/20; G05B 19/042; G05B 2219/2639
See application file for complete search history.

(56) References Cited

U.S. PATENT DOCUMENTS

| | | | | |
|---|---|---|---|---|
| 4,338,530 A | * | 7/1982 | Six ......................... | H03F 3/3435 327/558 |
| 5,428,295 A | * | 6/1995 | Beeman ............... | G01R 31/088 324/522 |

(Continued)

OTHER PUBLICATIONS

Dual current control of inverter-interfaced renewable energy sources for precise phase selection; pp. 5092-5102; by Azzouz et al.; Published 2018; (Year: 2018).*

(Continued)

*Primary Examiner* — Ramesh B Patel
(74) *Attorney, Agent, or Firm* — W & C IP

(57) ABSTRACT

A method for correct operation of the current-angle-based phase-selection method (PSM) is based on a proper dual current controller (DCC) for inverter interfaced sources during unbalanced fault conditions. The fault type is determined in the inverter using voltage-angle-based PSM. Accordingly, fault-type zones' bisectors of the current-angle-based are determined. Consequently, an initial negative-sequence current angle reference is determined to force the relative angle between the negative- and zero-sequence currents in the center of its correct fault-type zone. The initial positive-sequence current angle is determined according to reactive current requirements by grid codes. These initial angles are updated for accurate operation of the PSM and appropriate reactive current injection. Negative- and positive-sequence current references are determined in the stationary frame to comply with the reference angles and inverter's thermal limits. These references are regulated by a proportional-resonance controller.

19 Claims, 6 Drawing Sheets

(56) References Cited

U.S. PATENT DOCUMENTS

| | | | | | |
|---|---|---|---|---|---|
| 5,550,498 | A | * | 8/1996 | Kwan | H02M 1/40 |
| | | | | | 327/175 |
| 5,614,803 | A | * | 3/1997 | Morioka | H02M 7/53875 |
| | | | | | 318/590 |
| 5,644,238 | A | * | 7/1997 | Seifert | G01R 1/40 |
| | | | | | 324/132 |
| 5,835,361 | A | * | 11/1998 | Fitzgerald | H02H 7/1213 |
| | | | | | 363/21.03 |
| 6,009,000 | A | * | 12/1999 | Siri | H02J 1/102 |
| | | | | | 363/21.09 |
| 6,150,714 | A | * | 11/2000 | Andreycak | H01L 23/495 |
| | | | | | 257/536 |

OTHER PUBLICATIONS

A robust continuous-time MPC of a DC-DC boost converter interfaced with a grid-connected photovoltaic system; pp. 1-11; by Errouissi et al.; Published 2016, IEEE Journal of Photovoltaics. (Year: 2016).*

Stationary Frame Ciurrent Regulation of PWM Inverters With Zero Steady-State Error; pp. 814-822; by Zmood et al.; Publshed 2003. (Year: 2003).*

Predictive control of a three-level boost converter and an NPC inverter for high-power PMSG-based medium voltage wind energy conversion systems; pp. 5308-5310; by Yaramasu et al. Published 2013. (Year: 2013).*

Suggested grid code modifications to ensure wide-scale adoption of photovoltaic energy in distributed power generation systems; pp. 1-8; by Yang et al.; Published 2013 (Year: 2013).*

Yazdani et al: "Voltage-Sourced Converters in Power Systems", Modeling, Control, and Applications, pp. 61-66, 211-223.

Carrasco et al: "Improved Faulted Phase Selection Algorithm for Distance Protection under High Penetration of Renewable Energies", ENERGIES, vol. 13, No. 558, Jan. 23, 2020.

Hooshyar et al: "Fault Type Classification in Microgrids Including Photovoltaic DGs", IEEE Transactions On Smart Grid, vol. 7, No. 5, pp. 2218-2229, Sep. 2016.

Azzouz et al: "Resilience Enhancement of Microgrids With Inverter-Interfaced DGs by Enabling Faulty Phase Selection", IEEE Transactions On Smart Grid, vol. 9, No. 6, pp. 6578-6589, Nov. 2018.

Azzouz et al: "Dual Current Control of Inverter-Interfaced Renewable Energy Sources for Precise Phase Selection", IEEE Transactions On Smart Grid, vol. 10, No. 5, pp. 5092-5102, Sep. 2019.

Zmood et al: "Stationary Frame Current Regulation of PWM Inverters With Zero Steady-State Error", IEEE Transactions On Power Electronics, vol. 18, No. 3, pp. 814-822, May 2003.

* cited by examiner

DUAL CURRENT CONTROLLER OF INVERTER INTERFACED RENEWABLE ENERGY SOURCES FOR ACCURATE PHASE SELECTION METHOD AND GRID CODES COMPLIANCE

BACKGROUND OF THE INVENTION

Field of the Invention

The present invention generally relates to inverter interfaced renewable energy sources (IIRESs) and, more particularly, to an enhanced inverter interfaced renewable energy sources controller to solve the problem in detecting faulted phase(s) for lines emanating from renewable energy sources (RESs) and active distribution networks as well as provisioning the grid with the possible reactive power requirements.

Background Description

IIRESs are pervading in both transmission and distribution networks due to their benefits in terms of sustainability and being a clean source of energy. Thus, a large portion of fault currents measured by protection relays is supplied by IIRESs. However, the fault signatures for IIRESs differ from those of synchronous generators (SGs) as a SG is modeled by a voltage source behind a constant impedance, whereas an IIRES is modeled as a controlled current source, which depends on the controller objectives and grid-codes requirements. These differences in fault currents signature lead to maloperation of the conventional protection functions because they were designed based on the conventional SG model. Consequently, either the protection algorithms should be modified to cope with these exotic fault currents or the inverter should be augmented with new objectives to generate fault currents capable of operating the traditional protection functions.

IIRES control is a crucial element for enabling renewable energy sources (RESs) to be integrated into the grid. Hence, several IIRES controllers have been proposed to enhance the grid during normal and fault conditions. IIRES control studies can be divided into low-level and high-level controls. Low-level control is responsible for synchronizing IIRES output current at different grid conditions and tracking the reference current with high dynamics, minimum overshoot, and minimum error. In Yazdani and R. Iravani, Voltage-sourced converters in power systems, Hoboken, N.J., USA, Wiley, 2010, a phase-locked loop (PLL) is designed based on a high order transfer function to guarantee high robustness during unbalanced grid conditions. A PLL based on cost function minimization for voltages in the stationary frame has been proposed that reduces the calculation burden by eliminating the requirement for a rotating reference frame transformation. This method has been further enhanced by adding a filter to provide higher accuracy in contaminated grids. In another approach, second-order generalized integrator (SOGI) is used to extract the positive and negative-sequence components under grid faults with high precision. Different current controllers are analyzed in terms of computational burden, dynamic response, and harmonic compensation in yet another approach.

On the other hand, high-level control is responsible for determining the IIRES reference current which is classified according to the operation conditions into normal and fault conditions controllers. In normal operation, the controller is mainly implemented to control the positive-sequence current to extract the maximum power from RESs and to support the grid with ancillary services, such as reactive power support. In case of fault conditions, unbalanced voltages introduce several challenges to IIRES control. As a result, the IIRES controller is enhanced by controlling the negative-sequence current, using dual current controllers (DCCs), or controlling both the negative and zero-sequence current in transformerless IIRESs.

The DCCs aim to regulate both the positive and negative-sequence current components to enhance the operation of IIRESs by achieving specific objectives. In general, the positive-sequence controller is designed to achieve the grid-codes requirements by injected reactive power according to the voltage dip percentage and to regulate the dc-link voltage to a constant value. However, the former objective is mainly achieved by augmenting the IIRES with a chopper circuit to dissipate the surplus injected power from RESs which cannot be achieved by controlling the inverter currents only to avoid exceeding the thermal limits of the IIRES power-electronic components. On the other hand, the negative-sequence-current controller is mainly implemented to achieve specific power quality objectives. For example, balancing the output currents, eliminating active and reactive power oscillations, voltage support, and harmonic mitigations. One objective is injecting active power to the grid at unity power factor and eliminating the active and reactive power oscillations without exceeding the IIRES maximum current limit. This is achieved by determining the maximum active power that can be injected during fault to maintain the reference current lower than the maximum limit. In one approach, the sequence reference currents are calculated to inject the desired active and reactive power into the grid with minimum peak current, while in an alternative approach the reference current is calculated to control the reactive power and guarantee that phase voltages at the point of common coupling (PCC) are between their minimum and maximum limits.

Since IIRES output currents during fault conditions dramatically change according to the controller objective, they can be modeled as a current source that differs from the conventional fault current signature of SGs. Thus, the phase selection method (PSM) and other conventional protection functions are susceptible to failure for faults supplied from IIRESs. The failure of PSM, which is used to determine the faulty phases, could affect the reliability of the electric power networks by disconnecting healthy phases or affect the operation of other protection functions, such as distance protection. Hence, researchers have proposed modifications for the existing relays or changing the IIRES controller objective to enable robust operation for conventional PSM. E. Carrasco, M. Moreno, M. Martinez, and S. Vicente in "Improved faulted phase selection algorithm for distance protection under high penetration of renewable energies," *Energies*, vol. 13, no. 3, January 2020, utilize the conventional current-angle-based PSM, which is based on the relative angles between the superimposed negative and zero-sequence currents ($\delta_I^0$) and the negative and positive-sequence currents ($\delta_I^+$), within a small time range. Thus, the current-angle-based PSM could operate in grids containing IIRESs. However, the proposed method failed to determine the faulted phase in part of the test cases and there is no guarantee that the IIRES controller will not affect the PSM during the proposed operation time. A. Hooshyar, E. F. El-Saadany, and M. Sanaye-Pasand in "Fault type classification in microgrids including photovoltaic DGs," *IEEE Trans. Smart Grid*, vol. 7, no. 5, pp. 2218-2229, September 2016, propose determining the faulty phases based on the superimposed relative angles between the negative and zero-sequence and negative and positive-sequence voltages which successfully determine the faulted phases. However, this method requires changing the existence relays making it an expensive solution. On the other hand, M. A. Azzouz, A. Hooshyar, and E. F. El-Saadany in "Resilience enhancement of microgrids with inverter-interfaced DGs by enabling faulty phase selection," *IEEE Trans. Smart Grid,* 9(6): 6578-6589, November 2018, suggest controlling the negative-sequence current controller to mimic the negative-sequence SG model which can be represented by a constant impedance. M. A. Azzouz and A. Hooshyar, in "Dual current control of inverter-interfaced renewable energy sources for precise phase selection," *IEEE Trans. Smart Grid,* 10(5): 5092-5102, September 2019. propose controlling the negative-sequence current to operate either the relative angle between the negative and zero-sequence or the relative angle between the negative and positive-sequence. In this method, the authors determine the fault type by using voltage-angle-based PSM, then determine the proposed negative-sequence angle, which is used to determine the negative-sequence current reference. It is worth noting that both Azzouz et al. articles describe controlling the TIRES so that a portion of the conventional current-angle-based method could operate correctly but do not guarantee the robustness of the overall PSM in determining the faulted phases.

Most researchers investigate solutions for the fault detection maloperation from the relay side by trying to find new algorithms to cope with these peculiar fault currents which require changing the existing relays. However, these algorithms have not been validated to determine the faulted phase(s) for different fault resistances and grid topologies. On the other hand, recent researches propose to solve the problem by controlling the inverter to have the same current signature as synchronous generators (SGs). However, the proposed solutions only guarantee the operation for one method to determine the faulted phase but do not guarantee that other existing relay algorithms will operate correctly with these proposed controllers. Thus, there is a vital need for modifying IIRES's controller to guarantee the correct operation for the PSM protection system.

SUMMARY OF THE INVENTION

It is therefore an object of the present invention to enhance inverter interfaced renewable energy sources' (IIRESs') controller during different fault types, grid topologies, and fault resistances to solve the traditional relays problem in detecting the faulted phase(s) for lines emanating from renewable energy sources (RESs) and active distribution networks as well as provisioning the grid with the possible reactive power requirements. The invention mimics the significant fault current angles characteristics of the synchronous generator to operate the traditional current-angle-based phase selection method (PSM) while retaining the inverter's ability to control the reactive power injected into the grid within accepted boundaries. Thus, according to the invention, both negative and positive-sequence-current angles are controlled to achieve a comprehensive solution for the problem.

The negative-sequence-current angle is determined based on the measured zero-sequence-current angle and grid-codes (GCs) reactive power requirements in order to settle $\delta_I^o$ in its correct zone for determining the fault phase(s) and update $\delta_I^+$ to be as close as possible from its correct zones with maintaining the positive-sequence current to satisfy the reactive power requirements. This is achieved by determining the fault type at the IIRES side and calculating the zero-sequence-current angle, then determining the required negative-sequence-current angle to settle $\delta_I^o$ in its proper zone center angle. Then, it is further updated according to the reactive power requirements with a maximum shift ($\mu^o$) to correct $\delta_I^+$ operation without the failure of $\delta_I^o$. On the other hand, the positive-sequence-current angle will be modified by the minimum possible angle to inject the most appropriate reactive power according to the grid code requirements with the ability to settle $\delta_I^+$ in its correct zone. In addition, the invention controls both the positive and negative-sequence-current angles in the stationary frame (alpha-beta frame) instead of the synchronous frame (d-q frame), which reduces the number of the required controllers from four to two controllers and eliminates the requirement for determining the grid synchronous angle, which is difficult to be accurately detected in grids with large harmonics contents. Thus, the results of the controller are more accurate. Besides, the reference current in the synchronous frame is controlled using a proportion resonance (PR) controller which possesses a better dynamic response than the PI controller in the stationary frame. Thus, the controller could reach its desired reference angles faster which consequently decreases the relay delay time.

The invention provides a new perspective for controlling inverters, which is based on solving the problem of improper operation of the relay in detecting the faulted phase(s) with an endeavor to keep the substantial features of the inverter to enhance the voltage profile during faults. Thus, the invention avoids changing the relay algorithms which requires replacing the existing relays in the grid because solving the problem from the relay side is considered an expensive solution. Besides, it will operate both $\delta_I^o$ and $\delta_I^+$ correctly compared with other proposed inverter controllers that either operate $\delta_I^o$ or $\delta_I^+$. Moreover, the inverter controller takes into account the reactive power requirements. Finally, the inveter controller determines the reference currents in the stationary frame in order to reduce the number of controllers and to increase the controller speed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

The objective of the invention is operating the current-angle-based PSM at the relay side by taking into account the GC requirements. The current-angle-based PSM operates according to the values of $\delta_I^0$ and $\delta_I^+$. The fault type is detected according to the zones where the angles are settled. Thus, the inverter should control the output current to track an appropriate reference value of $\delta_I^0$ ($\delta_{I,ref}^0$) and reference value of $\delta_I^+$($\delta_{I,ref}^+$) which can operate the current-angle-based PSM with the ability to control reactive power within valid boundaries.

Figure 1:
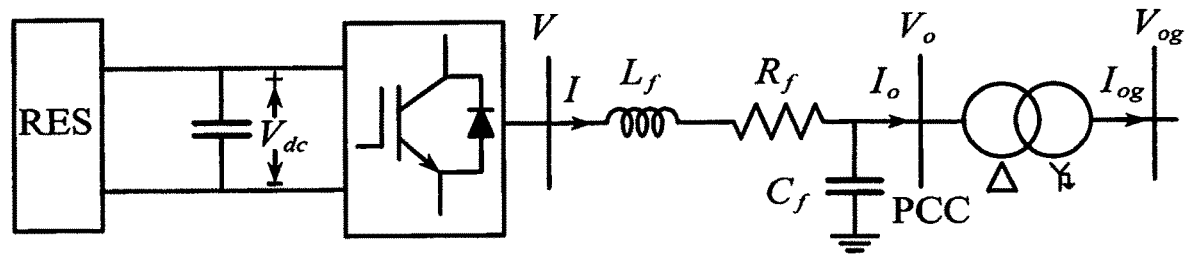
FIG. 1 is a block and circuit diagram of IIRES interfacing the grid through an LC filter.

The dynamic model for an TIRES interfaced to the grid through an LC low pass filter as shown in FIG. 1 can be represented in the stationary ($\alpha\beta$) frame as $$V_{\alpha\beta} - V_{oo\alpha\beta} = L_f \frac{dI_{\alpha\beta}}{dt} + R_f I_{\alpha\beta} \quad (1)$$

$$I_{\alpha\beta} - I_{oo\alpha\beta} = C_f \frac{dV_{oo\alpha\beta}}{dt} \quad (2)$$

where $L_f$, $R_f$ and $C_f$ represent the inductor, resistance, and capacitor of the LC low pass filter, respectively; V and I are the IIRES terminal voltage and output current, respectively; and $V_o$ and $I_o$ are the voltage and the current at the point of common coupling (PCC), respectively. To control the positive and negative-sequences separately, the stationary frame is separated into positive and negative-sequences which are given by $$F_{\alpha\beta} = F_{\alpha\beta}^+ + F_{\alpha\beta}^- = F_m^+ \begin{bmatrix} \sin(\omega t + \angle F^+) \\ -\cos(\omega t + \angle F^+) \end{bmatrix} + F_m^- \begin{bmatrix} \sin(\omega t + \angle F^-) \\ \cos(\omega t + \angle F^-) \end{bmatrix} \quad (3)$$

where F is an arbitrary phasor which can represent a voltage or current quantity, $F_m$ is the magnitude of the phasor, $\angle F$ is the phase angle of F, $\omega$ is the angular frequency, and the superscripts + and − represent the positive and negative-sequence components, respectively. By substituting for the positive and negative-sequence quantities in (3) into (1) and (2), the IIRES model in the positive and negative stationary frame can be represented by $$\begin{cases} V_\alpha^+ - V_{o\alpha}^+ = -\omega L_f I_\beta^+ + R_f I_\alpha^+ \\ V_\beta^+ - V_{o\beta}^+ = \omega L_f I_\alpha^+ + R_f I_\beta^+ \\ I_\alpha^+ - I_{o\alpha}^+ = -C_f V_{o\beta}^+ \\ I_\beta^+ - I_{o\beta}^+ = \omega C_f V_{o\alpha}^+ \end{cases} \quad (4)$$

$$\begin{cases} V_\alpha^- - V_{o\alpha}^- = -\omega L_f I_\beta^- + R_f I_\alpha^- \\ V_\beta^- - V_{o\beta}^- = \omega L_f I_\alpha^- + R_f I_\beta^- \\ I_\alpha^- - I_{o\alpha}^- = -C_f V_{o\beta}^- \\ I_\beta^- - I_{o\beta}^- = \omega C_f V_{o\alpha}^- \end{cases} \quad (5)$$

The positive and negative-sequence controller is designed in five stages as follows:

Stage 1: Determining the Initial Values of $\delta_{I,ref}^0$ and $\delta_{I,ref}^+$ ($\delta_{I,Iref}^0$ and $\delta_{I,Iref}^+$, Respectively).

Figure 2:
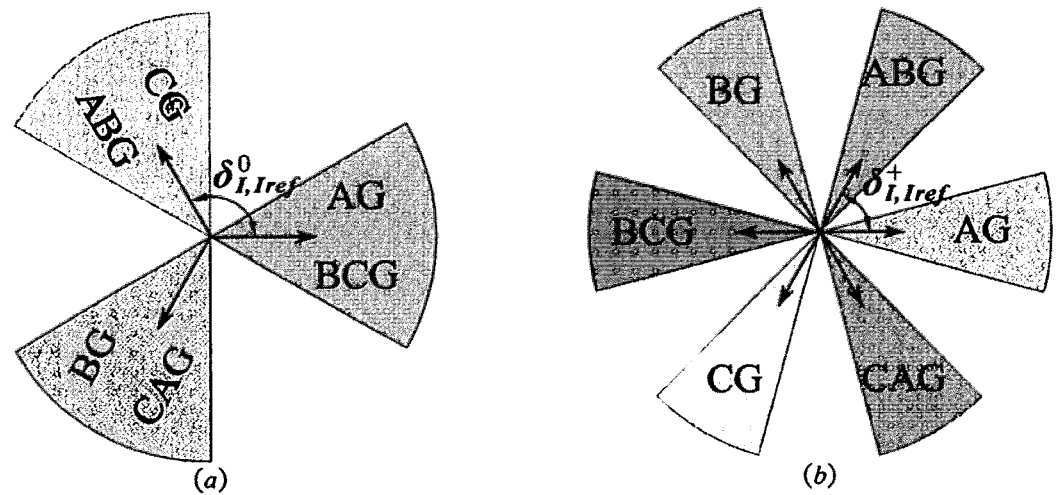
FIG. 2 are diagrammatic illustrations of current-angle-based PSM zones for (a) $\delta_I^o$ and (b) $\delta_I^+$.

The first step is determining the fault type at the inverter side by using the voltage-angle-based PSM. This method is based on the relative angles between the sequence voltages. The loci of $\delta_V^0$ (i.e., relative angle between the negative and zero-sequence voltages) suggest two fault types, thus, by further using $\delta_V^+$ (i.e., relative angle between the negative and positive-sequence voltages), the fault type will be specified accurately. Then, $\delta_{I,Iref}^0$ and $\delta_{I,Iref}^+$ are chosen according to the fault type to be settled in the center of the current-angle-based PSM correct zones as shown in FIG. 2. For example, for an AG fault, both $\delta_{I,Iref}^0$ and $\delta_{I,Iref}^+$ are designated to be zero. However, in an ABG fault, $\delta_{I,Iref}^0$ and $\delta_{I,Iref}^+$ are specified as 120° and 60°, respectively.

Stage II: Calculating the Initial Negative-Sequence-Current Angle Reference at the PCC ($\angle I_{o,ref}^-$).

$\angle I_{o,Iref}^-$ is specified to enforce $\delta_I^0$ to be equal $\delta_{I,Iref}^0$ at the transformer grid side which can be achieved from $$\angle I_{o,Iref}^- = \delta_{I,Iref}^0 + \angle I_{og}^0 + \theta_{tr}^0 \quad (6)$$

where $\angle I_{og}^0$ is the zero-sequence-current angle at the transformer grid-side and $\theta_{tr}^0$ is the phase shift introduced by the transformer connection. In the case of delta/star transformer, the negative-sequence current in the star side lags the current in the delta side by 30°. Thus, in order to enforce $\delta_{I,Iref}^0$ to be correctly achieved at the transformer grid side, $\theta_{tr}^0$ is selected to be 30°.

Figure 3:
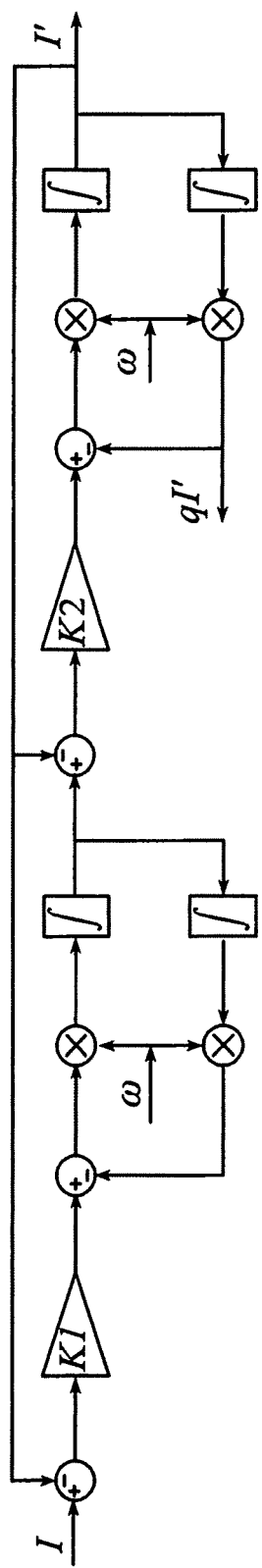
FIG. 3 is a block diagram of a double second-order generalized integrator structure.

$\angle I_{og}^0$ in (6) is calculated from the instantaneous value of zero-sequence-current ($I_{og}^0$) which is determined from the measured current phasors as $$I_{og}^0 = \frac{1}{3}(I_{og}^a + I_{og}^b + I_{og}^c) = I_{ogm}^0 \sin(\omega t + \angle I_{og}^0) \quad (7)$$

where $I_{ogm}^0$ represents the magnitude of the zero-sequence current at the transformer grid-side. Then, the zero-sequence current is converted into two orthogonal components using the double second-order generalized integrator (SO-SOGI) as shown in FIG. 3, where K1 and K2 are the SO-SOGI gains, I' is the filtered output current, and q represents a 90° phase shift from the input signal. Finally, the zero-sequence current angle is determined by $$\angle I_{og}^0 = \tan^{-1}\left(\frac{-I_{og\perp}^0}{I_{og}^0}\right) - \omega t \quad (8)$$

where $I_{og\perp}^0$ lags $I_{og}^0$ by 90° while $\omega t$ is determined from a digital clock to the overall controlled system.

Stage III: Generating the Reference Negative and Positive-Sequence-Current Angles at the PCC ($\angle I_{o,ref}^-$ and $\angle I_{o,ref}^+$, Respectively).

Figure 4:
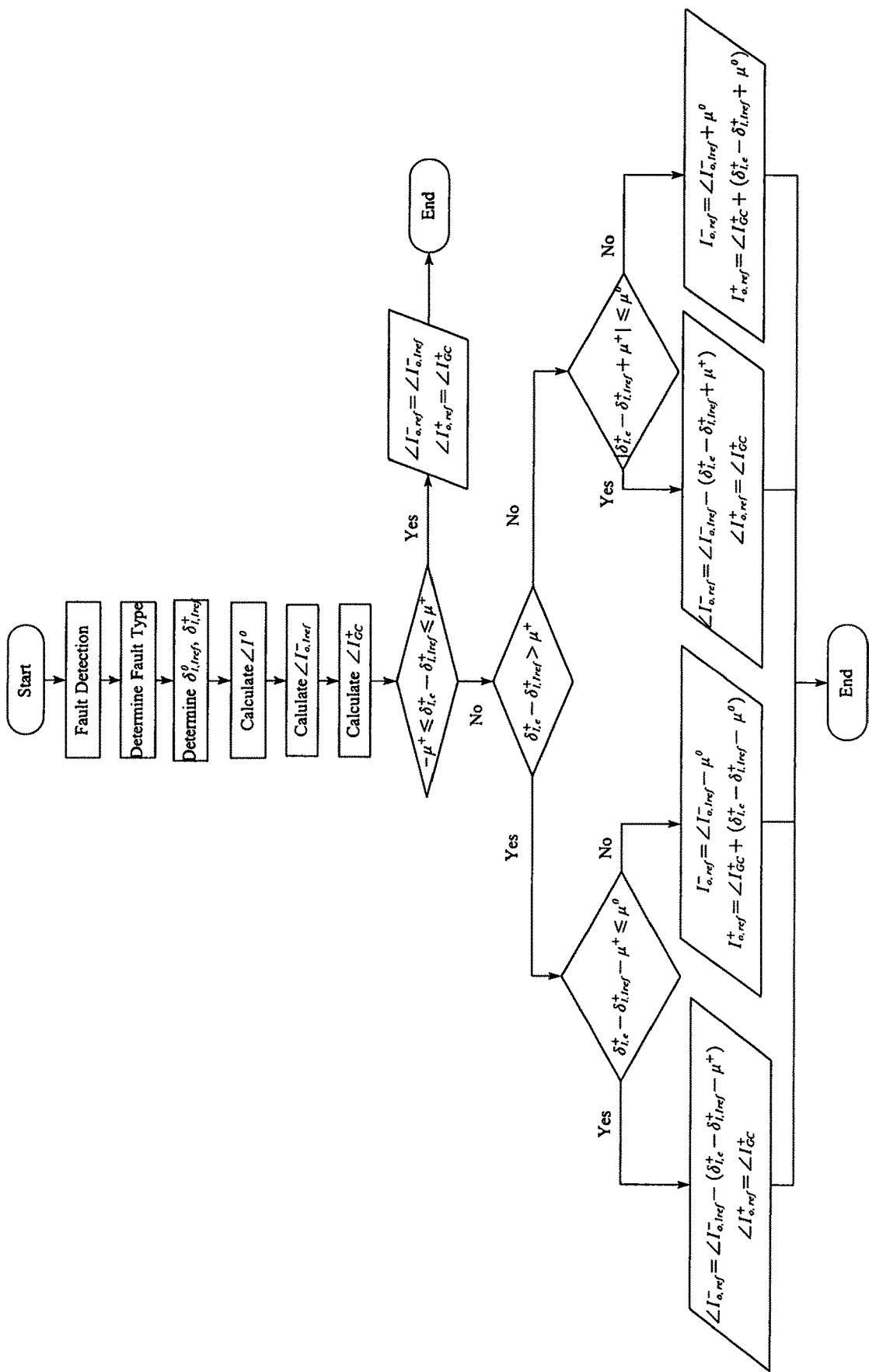
FIG. 4 is a flow diagram illustrating the procedures to determine $\angle I_{o,ref}^-$ and $\angle I_{o,ref}^+$ which is compatible with the current-angle-based PSM.

The process for determining $\angle I_{o,ref}^-$ and $\angle I_{o,ref}^+$ is shown in FIG. 4. First, the expected $\delta_I^+$ at the transformer grid-side ($\delta_{I,e}^+$) is calculated from (9) which represents the value of $\delta_I^+$ if $\angle I_{o,ref}^-$ equals $\angle I_{o,Iref}^-$ and $\angle I_{o,ref}^+$ equals the positive-sequence-current angle compatible with the grid-code requirement ($\angle I_{GC}^+$).

$$\delta_{I,e}^+ = \angle I_{o,Iref}^- - \angle I_{GC}^+ - \theta_{tr}^+ \quad (9)$$

where $\theta_{tr}^+$ represents the phase shift added between the negative and positive-sequence currents due to the transformer connection. The positive-sequence current is shifted by 30°, while the negative-sequence current is shifted by −30° when transferred from the delta to star side, i.e., $\angle I_o^+ - \angle I_{og}^+ = 30°$ and $\angle I_o^- - \angle I_{og}^- = -30°$. Thus, $\theta_{tr}^+$ is set 60° to determine $\delta_{I,e}^+$ precisely at the grid-side.

Then, the difference between $\delta_{I,e}^+$ and $\delta_{I,Iref}^+$ is checked. If $\delta_{I,e}^+ - \delta_{I,Iref}^+$ is between the reduced $\delta_I^+$ zone limits ($\pm\mu^+$) which are chosen to be $\pm 10°$ to leave 5° extra margin from the zone boundaries as the actual limits of $\delta_I^+$ zone is $+15°$. It is worth noting that the $\delta^+$ zone limits could be extended to $\pm 30$ to enhance the PSM reliability. Accordingly, $\mu^+$ can be extended to 25 to increase the controller ability to cope with different GCs. $\angle I_{o,Iref}^-$ and $\angle I_{GC}^+$ will be maintained to be the final negative and positive-sequence reference current angles ($\angle I_{o,ref}^-$ and $\angle I_{o,ref}^+$), respectively. Otherwise, $\angle I_{o,ref}^-$ and $\angle I_{o,ref}^+$ will be modified as follows. If $\delta_{I,e}^+ - \delta_{I,Iref}^+$ is greater than $\mu^+$ and the required shift for $\angle I_{o,Iref}^-$, i.e., $\delta_{I,e}^+ - \delta_{I,Iref}^+ - \mu^+$, is less than the reduced $\delta_I^0$ zone limits ($\mu^0$) which is selected to be 25° to have a 5° margin from $\delta_I^0$ actual zone limits. It is worth noting that the $\delta^0$ zone limits could reach $\pm 60$ to enhance the PSM reliability. Accordingly, $\mu^0$ can be extended to 55 to increase the controller ability to cope with different GCs. $\angle I_{o,ref}^-$ is formulated as $$\angle I_{o,ref}^- = \angle I_{o,Iref}^- - (\delta_{I,e}^+ - \delta_{I,Iref}^+ - \mu^+) \quad (10)$$

However, if the required shift for $\angle I_{o,Iref}^-$ is greater than $\mu^0$, then both $\angle I_{o,ref}^-$ and $\angle I_{o,ref}^+$ are altered as follows:

$$\begin{cases} \angle I_{o,ref}^- = \angle I_{o,Iref}^- - \mu^0 \\ \angle I_{o,ref}^+ = \angle I_{GC}^+ + (\delta_{I,e}^+ - \delta_{I,Iref}^+ - \mu^0) \end{cases} \quad (11)$$

On the other hand, if $\delta_{I,e}^+ - \delta_{I,Iref}^+$ is less than $-\mu^+$ and the required shift for $\angle I_{o,Iref}^-$, i.e., $|\delta_{I,e}^+ - \delta_{I,Iref}^+ + \mu^+|$, is less than $\mu^0$, then $\angle I_{o,Iref}^-$ is determined from $$\angle I_{o,ref}^- = \angle I_{o,ref}^- - (\delta_{I,e}^+ - \delta_{I,Iref}^+ + \mu^+). \quad (12)$$

However, if the required shift for $\angle I_{o,ref}^-$ is greater than $\mu^0$, then both $\angle I_{o,ref}^-$ and $\angle I_{o,ref}^+$ are modified as follows:

$$\begin{cases} \angle I_{o,ref}^- = \angle I_{o,Iref}^- + \mu^0 \\ \angle I_{o,ref}^+ = \angle I_{GC}^+ + (\delta_{I,e}^+ - \delta_{I,Iref}^+ + \mu^0) \end{cases} \quad (13)$$

$\angle I_{GC}^+$ in (9) is calculated in the stationary frame from the positive sequence which is compatible with the GC requirements as $$\angle I_{GC}^+ = \tan^{-1}\left(\frac{-I_{o\beta,GC}}{I_{o\alpha,GC}}\right) - \omega t \quad (14)$$

where $I_{o\alpha,GC}$ and $I_{o\beta,GC}$ are the expected positive-sequence currents that satisfy GC requirements in alpha and beta frame at the PCC, respectively. $I_{o\alpha,GC}$ and $I_{o\beta,GC}$ are further determined from the active- and reactive-power requirements as follows:

$$\begin{bmatrix} I_{o\alpha,GC} \\ I_{o\beta,GC} \end{bmatrix} = \frac{2}{3} \begin{bmatrix} \frac{V_{o\alpha}^+}{\sqrt{(V_{o\alpha}^+)^2 + (V_{o\beta}^+)^2}} & \frac{V_{o\beta}^+}{\sqrt{(V_{o\alpha}^+)^2 + (V_{o\beta}^+)^2}} \\ \frac{V_{o\beta}^+}{\sqrt{(V_{o\alpha}^+)^2 + (V_{o\beta}^+)^2}} & \frac{-V_{o\alpha}^+}{\sqrt{(V_{o\alpha}^+)^2 + (V_{o\beta}^+)^2}} \end{bmatrix} \begin{bmatrix} I_{P,Limit}^* \\ I_Q^* \end{bmatrix} \quad (15)$$

where $I_{P,limit}^*$ is the limited active power reference and $I_Q^*$ is the desired reactive current. $I_Q^*$ is determined from the GC requirements, while $I_P^*$ is determined by using a PI controller to keep the dc-link voltage at its reference value. During a fault, the positive current injected by the inverter may exceed the inverter thermal limits. Thus, the current should be limited to the inverter positive thermal limit ($I_{limit}^*$) which is in the range between 1.2 and 1.5 pu. It is worth noting that the reactive current is more significant during fault conditions so the active current is limited as $$I_{P,max}^* = \sqrt{(I_{limit}^+)^2 - (I_Q)^2} \quad (16)$$

where $I_{P,max}^*$ is maximum active current emanating from the inverter. Finally, $V_{o\alpha}^+$ and $V_{o\beta}^+$ is determined from the stationary frame voltages as $$\begin{bmatrix} V_{o\alpha}^+ \\ V_{o\beta}^+ \end{bmatrix} = \begin{bmatrix} 1 & -q \\ q & 1 \end{bmatrix} \begin{bmatrix} V_{o\alpha} \\ V_{o\beta} \end{bmatrix} \quad (17)$$

where q represents a 90° phase shift, which is determined by using the SO-SOGI as illustrated in FIG. 3.

Stage IV: Determining the Alpha-Beta Reference Currents at the Inverter Terminal The negative-sequence-current reference ($I_{ref}^-$) is designed to satisfy the negative-sequence current angle ($\angle I_{o,ref}^-$) generated in stage III and the IIRES thermal limit requirement ($I_{limit}^-$) which is selected to be 0.3 pu. First, $I_{o,ref}^-$ is determined in the negative-sequence stationary frame based on $\angle I_{o,ref}^-$ as follows:

$$\begin{cases} I_{o\alpha,ref}^- = I_{o,limit}^- \sin(\omega t + \angle I_{o,ref}^-) \\ I_{o\beta,ref}^- = I_{o,limit}^- \cos(\omega t + \angle I_{o,ref}^-) \end{cases} \quad (18)$$

where $I_{o\alpha,ref}^-$ and $I_{o\beta,ref}^-$ represent the alpha and beta negative-sequence-current references at the PCC, respectively, and $I_{Limit}^-$ is the maximum negative-sequence current at the PCC which is determined by solving a second-order equation determined from (5) and (18) by $$(I_{o,limit}^-)^2 + I_{o,limit}^-(2\omega C_f V_o^- \sin(\angle I_{o,ref}^- - \angle V_o^-)) + ((\omega C_f V_o^-)^2 - (I_{limit}^-)^2) = 0 \quad (19)$$

To compensate for the capacitor effect, $I_{ref}^-$ is finally formulated in the negative-sequence stationary frame as $$\begin{cases} I_{\alpha,ref}^- = I_{o\alpha,ref}^- + \omega C_f V_{o\beta}^- \\ I_{\beta,ref}^- = I_{o\beta,ref}^- - \omega C_f V_{o\alpha}^- \end{cases} \quad (20)$$

where $I_{\alpha,ref}^-$ and $I_{\beta,ref}^-$ represent the alpha and beta negative-sequence-current reference at the inverter terminal, respectively.

On the other hand, the positive-sequence-current reference ($I_{ref}^+$) is formulated to ensure that its angle ($\angle I_{ref}^+$) is enforced to generate the correct $\angle I_{o,ref}^+$ determined from stage III. First, the new reactive-current reference ($I_{Q,new}^*$) is calculated from (21) based on $I_{P,limit}^*$ and the angle between $I_{o,ref}^+$ and $I_P^*$, i.e., $\angle I_{o,ref}^+ - \angle V_o^+$.

$$I_{Q,new}^* = I_{P,limit}^* \tan(\angle I_{o,ref}^+ - \angle V_o^+) \quad (21)$$

Then, both $I_{Q,new}^*$ and $I_{P,limit}^*$ pass by a current limiter to avoid exceeding the IIRES thermal limits without changing its phase angle. If $I_{o,ref}^+$ exceeds its maximum positive-sequence current limit at the point of common coupling ($I_{o,limit}^+$), then $I_{Q,new}^*$ and $I_{P,limit}^*$ are updated as $$\begin{cases} I_{Q,new,limit}^* = I_{Q,new}^* \times \dfrac{I_{o,limit}^+}{\sqrt{(I_{Q,new}^*)^2 + (I_{P,limit}^*)^2}} \\ I_{P,new,limit}^* = I_{P,Limit}^* \times \dfrac{I_{o,limit}^+}{\sqrt{(I_{Q,new}^*)^2 + (I_{P,limit}^*)^2}} \end{cases} \quad (22)$$

Subsequently, the positive-sequence-current references in the stationary frame at the PCC ($I_{o\alpha,ref}^+$ and $I_{o\beta,ref}^+$) are obtained by $$\begin{bmatrix} I_{o\alpha,ref}^+ \\ I_{o\beta,ref}^+ \end{bmatrix} = \dfrac{2}{3} \begin{bmatrix} \dfrac{V_{o\alpha}^+}{\sqrt{(V_{o\alpha}^+)^2 + (V_{o\beta}^+)^2}} & \dfrac{V_{o\beta}^+}{\sqrt{(V_{o\alpha}^+)^2 + (V_{o\beta}^+)^2}} \\ \dfrac{V_{o\beta}^+}{\sqrt{(V_{o\alpha}^+)^2 + (V_{o\beta}^+)^2}} & \dfrac{V_{o\alpha}^+}{\sqrt{(V_{o\alpha}^+)^2 + (V_{o\beta}^+)^2}} \end{bmatrix} \begin{bmatrix} I_{P,new,limit}^* \\ I_{Q,new,limit}^* \end{bmatrix} \quad (23)$$

Thereafter, the IIRES terminal positive-sequence-current references ($I_{\alpha,ref}^+$ and $I_{\beta,ref}^+$) are expressed as follows:

$$\begin{cases} I_{\alpha,ref}^+ = I_{o\alpha,ref}^+ - \omega C_f V_{o\beta}^+ \\ I_{\beta,ref}^+ = I_{o\beta,ref}^+ + \omega C_f V_{o\alpha}^+ \end{cases} \quad (24)$$

Finally, the alpha and beta reference currents at the inverter terminals ($I_{\alpha,ref}$ and $I_{\beta,ref}$) are determined by $$\begin{cases} I_{\alpha,ref} = I_{\alpha,ref}^+ + I_{\alpha,ref}^- \\ I_{\beta,ref} = I_{\beta,ref}^+ - I_{\beta,ref}^- \end{cases} \quad (25)$$

Stage V: Tracking the Reference Current.

Figure 5:
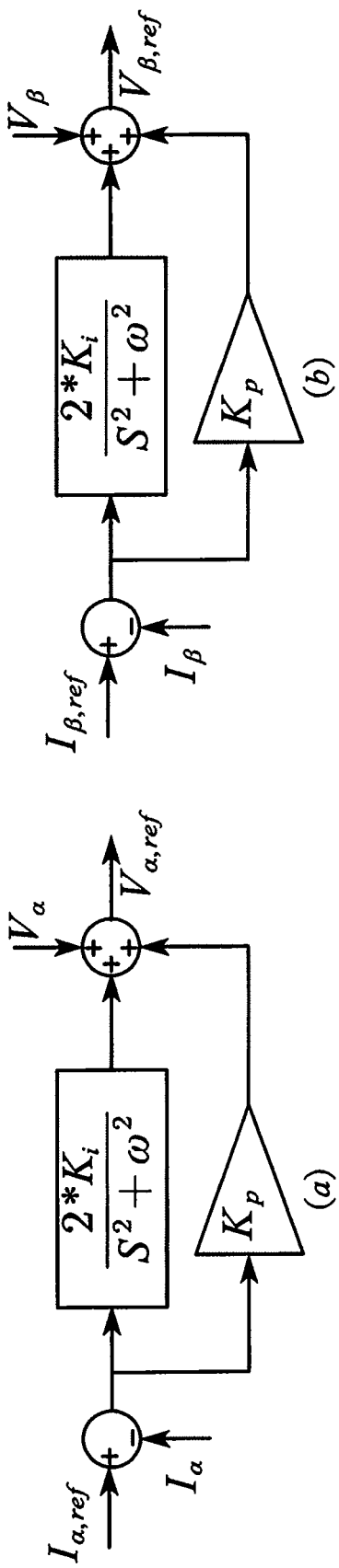
FIG. 5 are block diagrams of (a) alpha frame PR controller and (b) beta frame PR controller.

The reference currents in the alpha and beta frame are controlled using a proportional resonance (PR) controller as shown in FIG. 5 where its parameters are determined based on the procedures in Yazdani et al. (ibid) and D. N. Zmood and D. G. Holmes in "Stationary frame current regulation of PWM inverters ith zero steady-state error", in *IEEE Transactions on Power Electronics*, vol. 18, no. 3, pp. 84-822, 2003.

Figure 6:
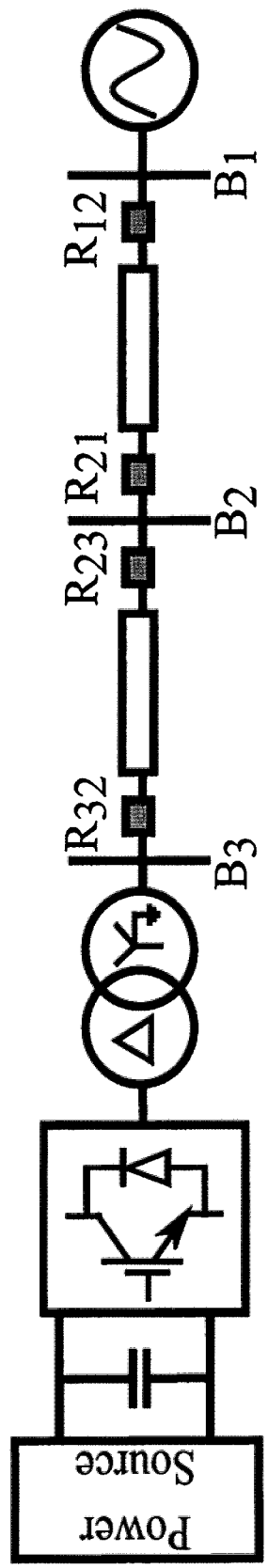
FIG. 6 is a block and circuit diagram of a sample test system.

The invention was tested in Matlab/Simulink environment to validate its ability in operating the current-angle-based PSM correctly and maintaining the GC requirements within permissible limits. FIG. 6 illustrates the test system which normally operates at 34.5 kV and 60 Hz. It consists of a 9.2-MW IIRES connected to bus 3 through a delta-star-ground transformer with rated power 14-MW and x=0.1 pu. The rated voltages for the IIRES and gird side are 4.16 kV and 34.5 kV, respectively. The system reference reactive power is determined by the North American GC in which the reference reactive current injected to the grid ($I_Q^*$) is zero. The system is tested for an AG fault for different fault resistances to demonstrate the effectiveness of the proposed method.

Figure 7:
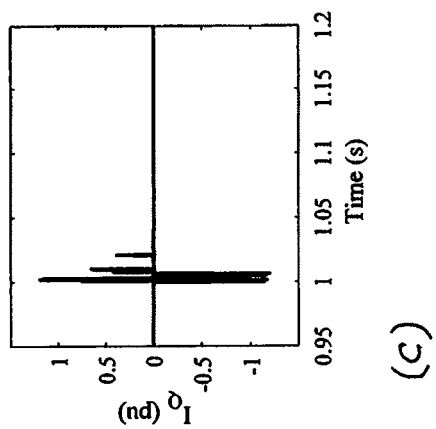
FIG. 7 are graphs of measured quantities at AG fault at run at $R_{flt}=50\Omega$: (a) $\delta_I^+$, (b) $\delta_I^o$, and (c) $I_Q$.
Figure 7:
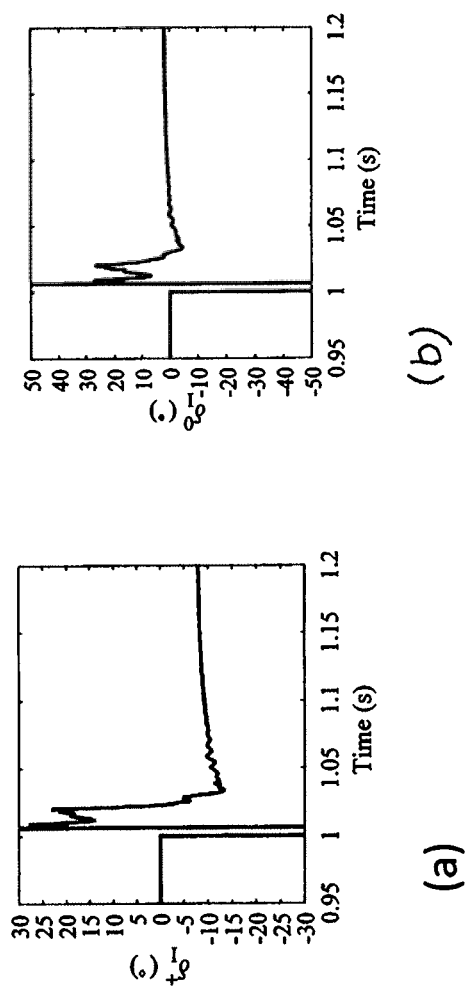
Figure 8:
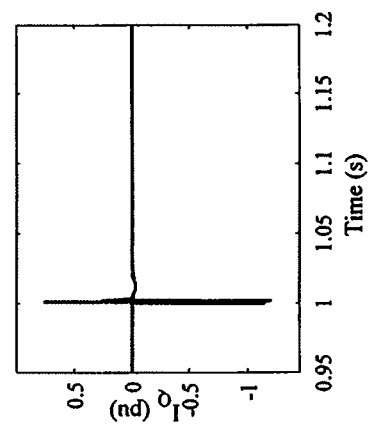
FIG. 8 are graphs of measured quantities at AG fault at run at $R_{flt}=10\Omega$: (a) $\delta_I^+$, (b) $\delta_I^o$, and (c) $I_Q$.
Figure 8:
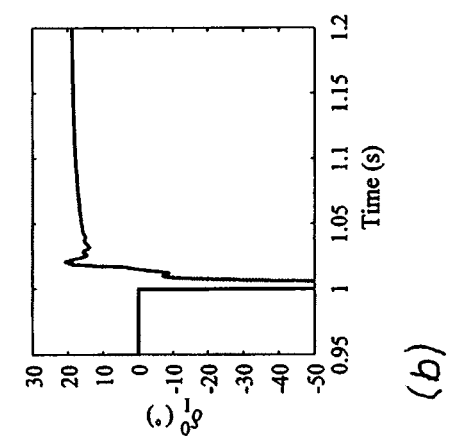
Figure 8:
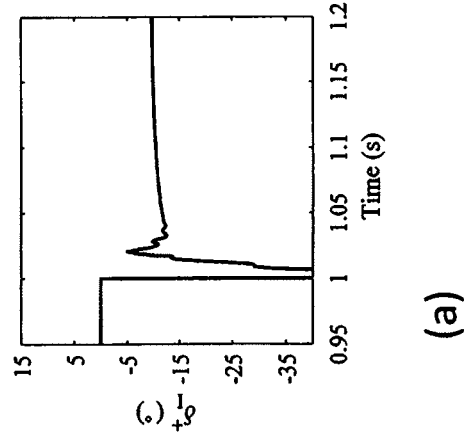
Figure 9:
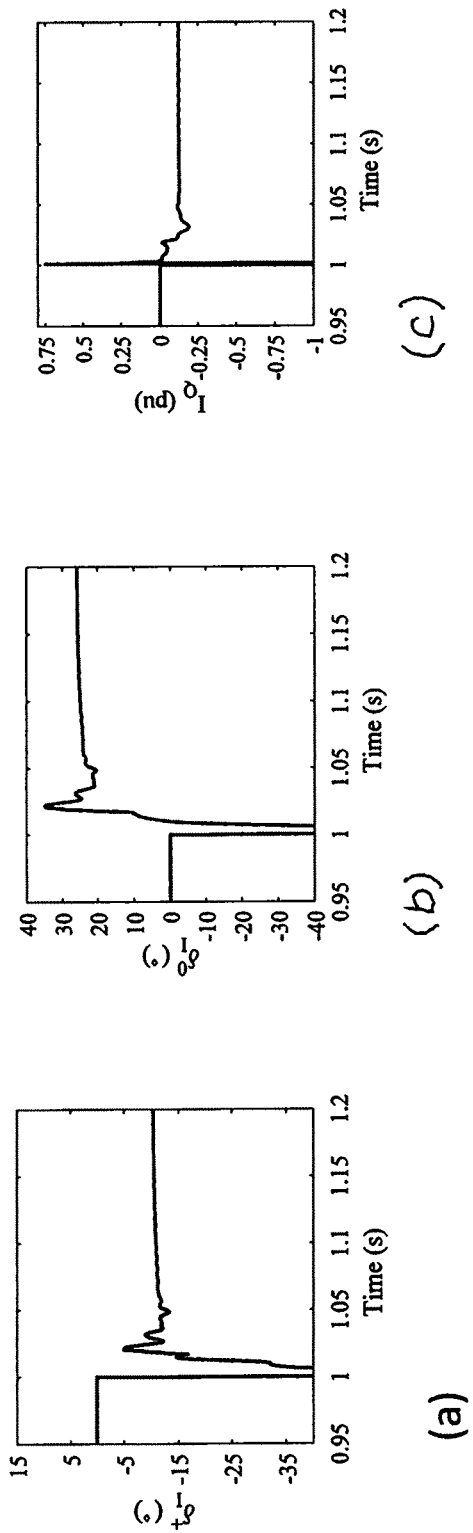
FIG. 9 are graphs of measured quantities at AG fault at run at $R_{flt}=5\Omega$: (a) $\delta_I^+$, (b) $\delta_I^o$, and (c) $I_Q$.
Figure 10:
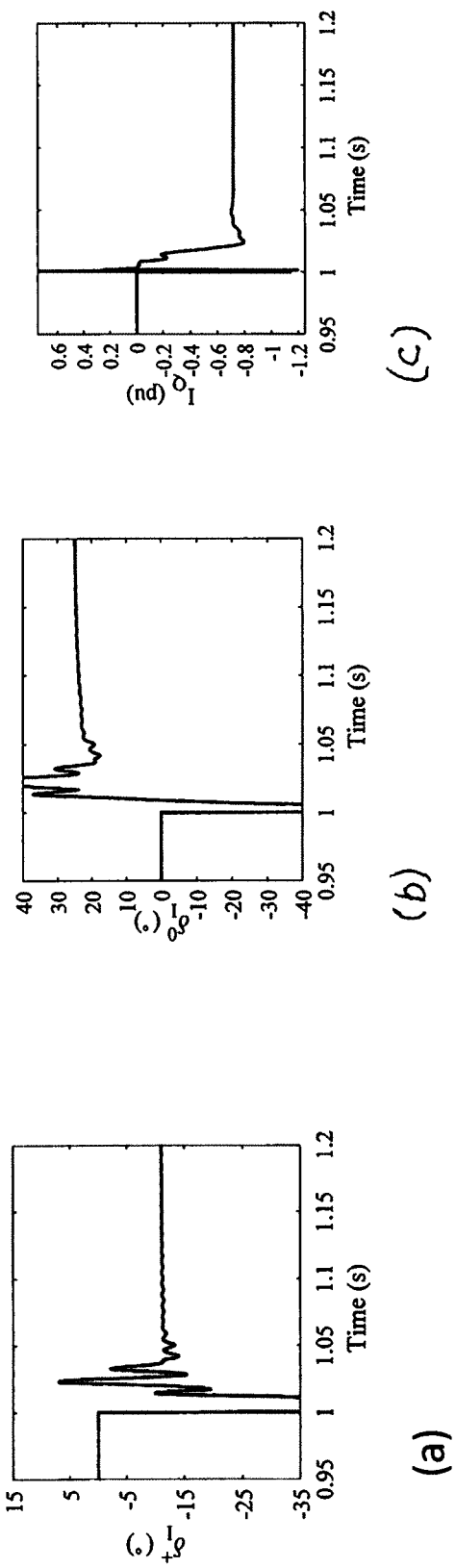
FIG. 10 are graphs of measured quantities at AG fault at run at $R_{flt}=1\Omega$: (a) $\delta_I^+$, (b) $\delta_I^0$, and (c) $I_Q$.

For a fault resistance ($R_{flt}$=50Ω), $\delta_I^+$ settles in the AG fault correct zone at −7°, as shown in FIG. 7. Since $\delta_I^+$ settles correctly in the AG zone and it is lower than 10° ($\mu^+$), the negative-sequence current is maintained to place $\delta_I^0$ at the zone bisector which can be verified by FIG. 7. In addition, $I_Q$ remains zero during the fault as expected from the GC requirements because the controller succeeds to enforce both $\delta_I^0$ and $\delta_I^+$ in their correct zones without the need to change the positive-sequence current angle. FIG. 8 represents the case when $R_{flt}$=10 Ω, $\delta_I^+$ is settled in the AG zone at −$\mu^+$ and $\delta_I^0$ is located correctly in the AG fault zone at 20° which is still lower than $\mu^0$. This implies that $\angle I_{o,Iref}^-$ is unable to operate both $\delta_I^+$ and $\delta_I^0$, and thus, it is corrected by adding 20° to $\angle I_{o,Iref}^-$. It is worth noting that $\delta_I^0$ settles at a value lower than $\mu^0$, so there is no necessity to change the positive-sequence current reference. Thus, $I_Q$ preserves its GC requirement and is kept at zero. FIGS. 9 and 10 represent a small fault resistance condition when $R_{flt}$=5Ω and 1Ω, respectively. For both cases, $\delta_I^+$ and $\delta_I^0$ settle at $\mu^+$ and $\mu^0$ which determine correctly an AG fault with 5° preserved margin. To avoid $\delta_I^+$ and $\delta_I^0$ to surpass its zone limits, the positive-sequence angle is modified leading to variation from the reactive power GC requirements. It is worth noting that the SG current during high resistive fault is mainly active. However, when the fault resistance decreases, the fault current of the SG becomes mainly reactive. Thus, as the fault resistance decreases, the injected reactive power should increase to comply with the conventional SG behavior. This is illustrated using the absolute magnitude of $I_G$ which equals 0.12 pu in FIG. 9 but in FIG. 10 it increases to reach 0.72 pu.

From the foregoing, it will be appreciated that the invention solves the problem of improper operation of the traditional current-angle-based phase selection method (PSM) without replacing existing relays thus making for a less expensive solution. The invention maintains important features of the inverter controller by keeping the inverter's ability to inject power during faults, which enhances the voltage profile of the grid during faults.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for securing a correct operation of a current-angle-based phase-selection method (PSM) when fault currents are supplied from inverter interfaced renewable energy sources (IIRESs), comprising:
  determining a fault type by an inverter;
  selecting initial current angle references;
  determining current angle references;
  determining a reference current in a stationary frame; and
  tracking the stationary frame reference current with a proportional-resonance (PR) controller.

2. The method according to claim 1, wherein the current-angle-based PSM is based on relative angles between negative- and zero-sequence currents and negative- and positive-sequence currents.

3. The method according to claim 1, wherein the IIRES is connected to a grid through a low-pass filter and a transformer.

4. The method according to claim 3, wherein the transformer is a delta/star-ground transformer.

5. The method according to claim 1, wherein the fault type determination is performed by a voltage-angle-based PSM, which is based on relative angles between negative- and zero-sequence voltages and negative- and positive-sequence voltages.

6. The method according to claim 1, wherein the initial current angle references are selected by determining initial positive- and negative-sequence currents angles independently.

7. The method according to claim 6, wherein the initial positive-sequence current angle is based on reactive current requirements by grid codes and active current regulating a direct current (DC) link voltage.

8. The method according to claim 7, wherein the active current is determined by a proportional-integral controller augmented with a feedforward controller to regulate the DC link voltage.

9. The method according to claim 6, wherein the initial negative-sequence current angle is selected based on the fault type and zero-sequence current angle measured at a grid side to force a relative angle between negative- and zero-sequence currents to be in the center of current-angle-based PSM correct fault-type zone.

10. The method according to claim 9, wherein the zero-sequence current angle is determined by converting a measured zero-sequence current into two orthogonal components using a double second-order generalized integrator (SO-SOGI).

11. The method according to claim 1, wherein the references for negative- and positive-sequence current angles are determined to secure correct operation for the current-angle-based PSM.

12. The method according to claim 11, wherein the current angle references comprising a negative-sequence current angle reference that is determined by updating an initial negative-sequence current angle reference to have a proper relative angle, according to current-angle-based PSM, between the negative- and zero-sequence currents and negative- and positive-sequence current.

13. The method according to claim 12, further comprising updating the initial negative-sequence current angle reference in a manner limited by maximum and minimum shift angles to prevent violating fault-type zone requirements for the relative angle between the negative- and zero-sequence current angles.

14. The method according to claim 13, wherein the maximum and minimum shift angles are 25° and −25°, respectively.

15. The method according to claim 11, wherein the positive-sequence current angle reference is determined by updating its initial angle to guarantee that a relative angle between the negative- and positive-sequence currents are in a reduced current-angle-based PSM fault-type zone.

16. The method according to claim 15, wherein the reduced current-angle-based PSM fault-type zone is determined by reducing current-angle-based PSM fault-type zones by a margin set at 5°.

17. The method according to claim 15, wherein the initial positive-sequence current angle is updated only if a required shift for the initial negative-sequence current angle reference overrides either its maximum or minimum shift angles.

18. The method according to claim 1, wherein the reference currents are determined based on the negative- and positive-sequence current angle references and maximum thermal limits.

19. The method according to claim 18, wherein the negative- and positive-sequence maximum limits are set at 0.3 and 1.2 per unit, respectively.

* * * * *